United States Patent [19]
Donais et al.

[11] Patent Number: 5,863,079
[45] Date of Patent: Jan. 26, 1999

[54] QUICK CONNECT/DISCONNECT COUPLING

[75] Inventors: Michel Donais; Denis Lamontagne, both of Quebec, Canada

[73] Assignee: Gestion Michel Donais, Quebec, Canada

[21] Appl. No.: 821,051

[22] Filed: Mar. 20, 1997

[51] Int. Cl.⁶ .................................................. F16L 55/00
[52] U.S. Cl. .............................. 285/45; 285/84; 285/312; 285/379; 285/422
[58] Field of Search .................................... 285/311, 312, 285/315, 316, 45, 84, 379, 422

[56] References Cited

U.S. PATENT DOCUMENTS

| | | | |
|---|---|---|---|
| 3,052,488 | 9/1962 | Bruning | 285/45 X |
| 3,439,942 | 4/1969 | Moore et al. | |
| 3,860,274 | 1/1975 | Ledstrom | 285/312 |
| 5,005,876 | 4/1991 | Fahl | 285/312 X |
| 5,127,678 | 7/1992 | Henning | 285/45 |
| 5,295,717 | 3/1994 | Chen | 285/312 X |

FOREIGN PATENT DOCUMENTS 2117115  3/1994  Canada .

Primary Examiner—Dave W. Arola
Attorney, Agent, or Firm—Marvin S. Townsend

[57] ABSTRACT

A quick connect/disconnect coupling comprised of a male coupling adapted to mate with a female coupling, the female coupling forming a passageway to receive the male coupling, and locking means for retaining the male coupling in said female coupling. The locking means being comprised of a locking lever pivotably mounted to the female coupling and having a cooperating projection adapted to extend through the coupling into the passageway to engage an annular cavity of the male coupling to maintain the male coupling into a mating relationship with the female coupling when the locking lever is in a closed position. The male and female couplings are provided with a reinforced annular rim, the reinforced annular rim of the male coupling extends radially of the coupling at a mid-portion thereof. The reinforced annular rim of the female coupling extends radially of said coupling at the distal end thereof, such that when said male coupling is inserted and locked into said female coupling, the reinforced annular rims of the male and female couplings lie adjacent one another.

11 Claims, 4 Drawing Sheets

QUICK CONNECT/DISCONNECT COUPLING

BACKGROUND OF THE INVENTION

1. Field of the Invention

This invention relates to couplings and more particular to quick connect/disconnect couplings having a male and female member.

2. Description of the Prior Art

Quick connect/disconnect couplings are usually provided at the end of flexible hoses connected to large volume pumps, such as for emptying septic tanks or for pumping water from construction sites, etc. These are also used in the quick coupling of hoses for the handling toxic and acid liquids.

One of the problems associated with these couplings is that they are subject to a fair amount of abuse and the coupling eventually loses its "round".

In a quick disconnect coupling, a pair of levers is pivotably mounted on the female member for camming cooperation with the male member to quickly attach or detach the male member to the female member. In order to prevent accidental opening of the levers, the levers will be bet up so as to be flush-mounted with the coupling or flexible hose, such that if the coupling is dropped, the levers will not accidentally open. However, since the couplings are made to be quickly removed, the levers have to be easily handled by an operator. To facilitate the opening of the levers, pull rings have been provided in the past to locking levers to enable an operator to open the levers and release the coupling. Examples of such pull rings for operating levers of quick connect/disconnect coupling are shown in U.S. Pat. No. 3,439,942 and published Canadian application 2,117,115.

However, as indicated in Canadian patent application 2,117,115, the use of pull rings with locking levers can often interfere with the operation of the levers.

SUMMARY OF THE INVENTION

It is therefore an object of the present invention to provide a quick connect/disconnect coupling which is designed to overcome the problems associated with the prior art.

Another object of the present invention is to provide a quick connect/disconnect coupling which is easy to connect and disconnect by an operator and yet provides a more robust design to resist damaging blows and general abuse of day-to-day usage.

Yet another object of the present invention is to provide a quick connect/disconnect coupling wherein the male and female couplings are provided with reinforced annular rims adapted to provide added protection to the connecting and sealing ends of the coupling.

Yet another object of the present invention is to provide a quick connect/disconnect coupling wherein the female coupling is provided with an annular seat adapted to retain a gasket for sealing the male coupling against the female coupling and to prevent the gasket from becoming dislodged during operation, removal and connection of the coupling.

Yet another object of the present invention is to provide a quick connect/disconnect coupling wherein the locking levers can easily be opened by an operator and yet can be locked in place to prevent accidental opening.

A still further object of the present invention is to provide a quick connect/disconnect coupling wherein the female passageway has a flared opening in order to enhance the facility to connect and disconnect the coupling.

In accordance with an embodiment of the present invention, there is provided a quick connect/disconnect coupling comprised of a male coupling adapted to mate with a female coupling, the female coupling forming a passageway to receive the male coupling, and locking means for retaining the male coupling into the female coupling, the locking means being comprised of a locking lever pivotably mounted to the female coupling and having a cooperating projection adapted to extend through the coupling into the passageway to engage can annular cavity of the male coupling to maintain the male coupling into a mating relationship with the female coupling when the locking lever is in a closed position, characterized by the male and female couplings being provided with a reinforced annular rim, the reinforced annular rim of the male coupling extending radially of the coupling at a mid-portion thereof, the reinforced annular rim of the female coupling extending radially of the coupling at the distal end thereof, suck that when the male coupling is inserted and locked into the female coupling, the reinforced annular rims of the male and female coupling lie adjacent one another.

BRIEF DESCRIPTION OF THE DRAWINGS

The invention will be better understood by an examination of the following description, together with the accompanying drawings, in which.

DESCRIPTION OF THE PREFERRED EMBODIMENTS

Figure 1:
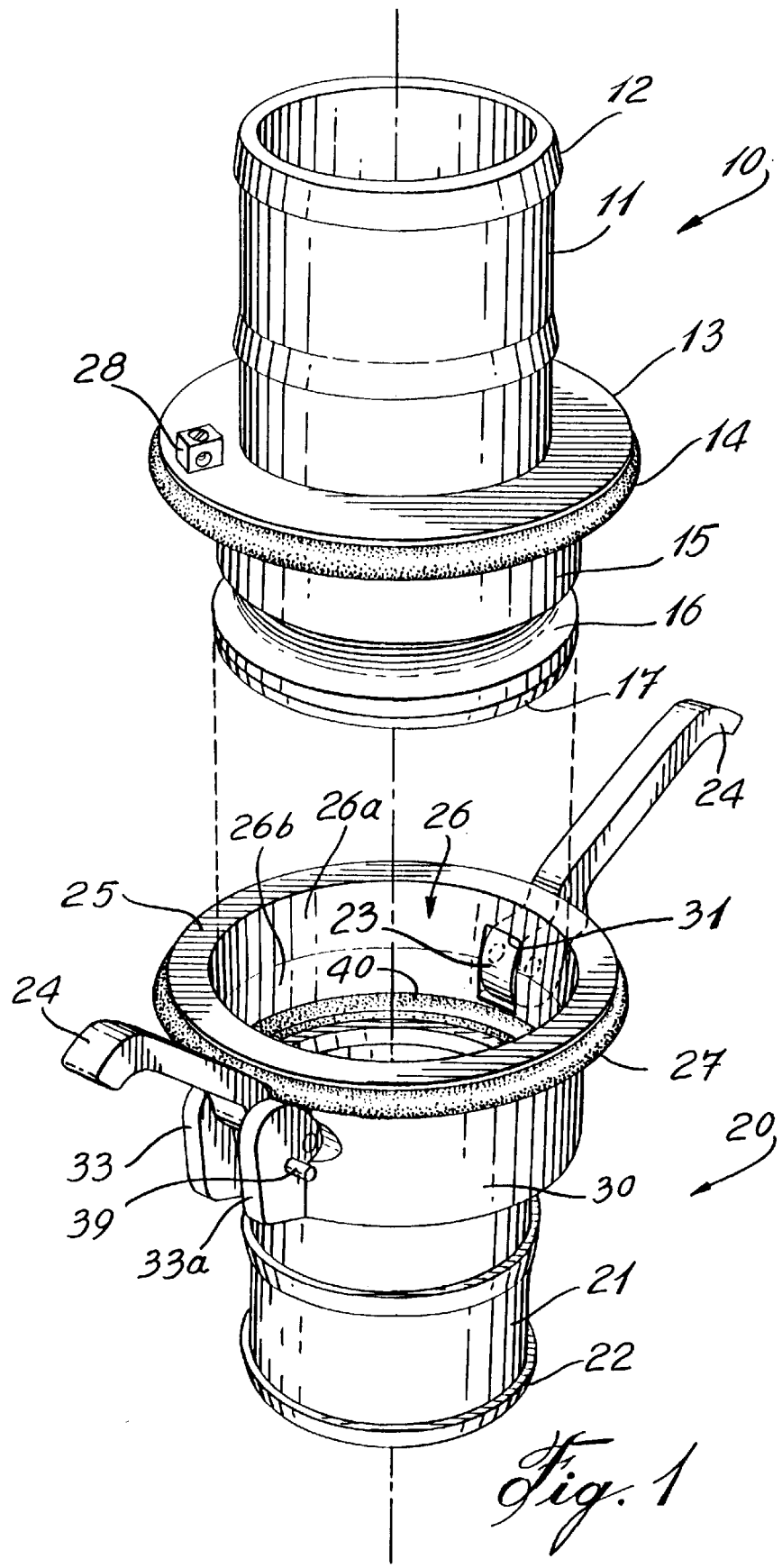
FIG. 1 is a perspective view of the quick connect/disconnect coupling of the present invention.

Referring now to FIG. 1, the quick connect/disconnect coupling is illustrated without an attachment to a flexible hose. The male coupling 10 is shown disconnected from the female coupling 20 so as to better illustrate the various features of each coupling. The stem portions 11 and 21 of the male and female couplings respectively, are each provided with one or more pair of ribs 12 and 22 in order to secure a flexible hose thereto. In one embodiment, the stem portions 11 and 21 of the male and female couplings, can be threadably mounted to permit the couplings to be interchanged with other types of couplings.

The male coupling 10 is provided with a reinforced annular rim 13 which extends radially of the coupling at the mid portion thereof. A resilient bumper which can be formed of a rubber O-ring, is used to protect the connecting end 15 of the coupling. The O-ring-shaped bumper 14 fits into an annular groove around the periphery of reinforced annular rim 13.

The connecting end 15 of male coupling 10 is provided with annular cavity 16 adapted to be engaged, when the male coupling is inserted in the female coupling, by the cooperating end 23 of locking lever 24. The periphery 17 of the distal end of the connecting portion of male coupling 10 is provided with an outer edge which is slightly, beveled inwardly to facilitate the penetration of the connecting end 15 into the passageway formed by the female coupling 20.

The female coupling 20 is also provided with a reinforced annular rim 25. However, the reinforced annular rim 25 of female coupling 20 extends radially of the coupling at the distal end thereof, such that when the male coupling is inserted and locked into the female coupling, the reinforced annular rim 13 of the male coupling lies adjacent the reinforced annular rim 25 of female coupling 20. The combination of the two reinforced annular rims provides a coupling which is much more resistant to shock or abuse in the field. The female coupling 20 is provided with an inner wall 26 which slightly flares outwardly to facilitate entry of the connecting end 15 of male coupling 10. The inner wall 26 is cylindrical in the bottom portion thereof as indicated at 26b in FIG. 2, up to the level of the cam openings 31. Above that, the wall 26 is flared at 26a. Annular reinforced rim 25 is also provided at its periphery with a cavity to accept an O-ring-shaped bumper 27 made of resilient rubber.

The terminal 28 permits the coupling to be grounded when necessary.

Figure 2:
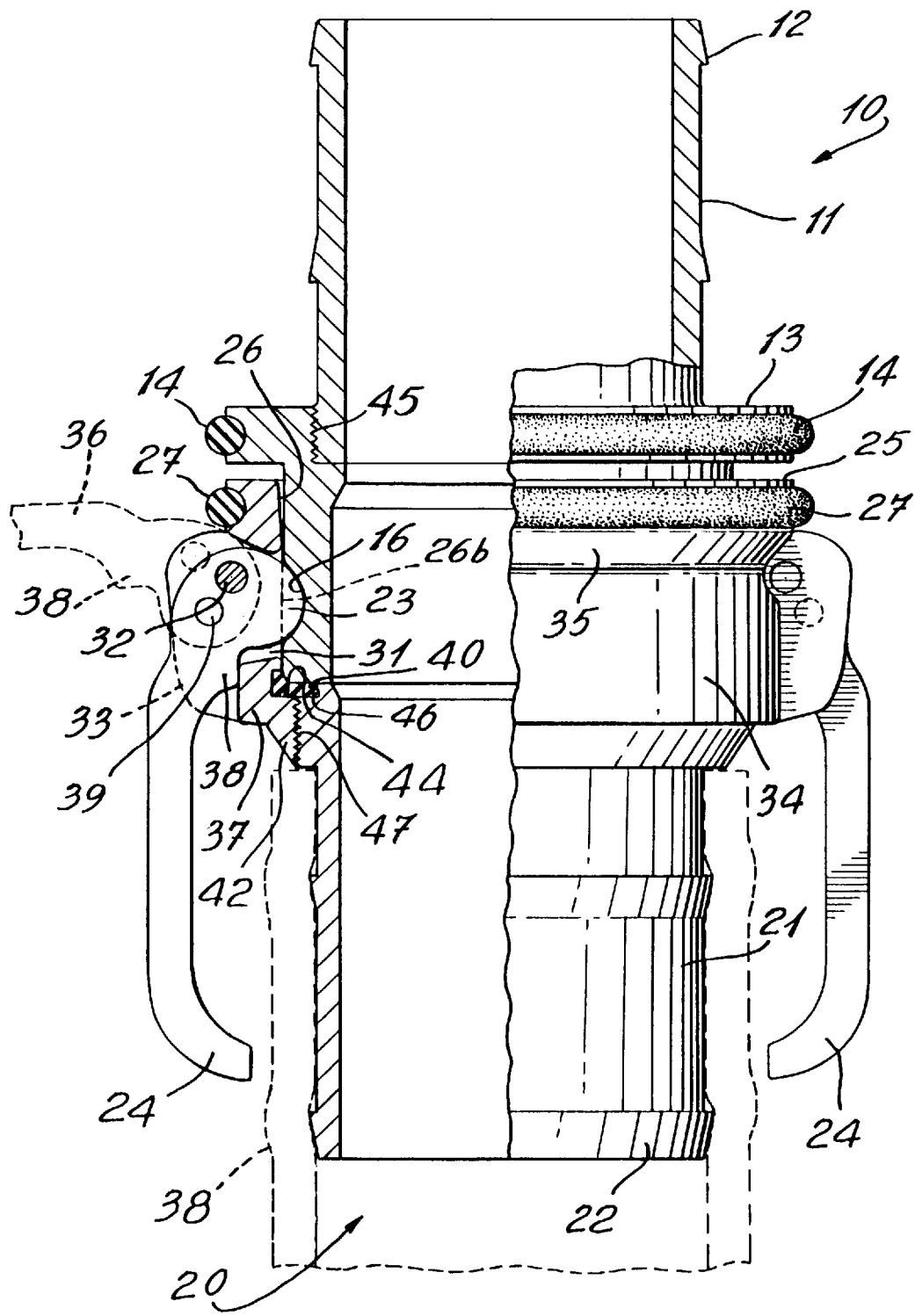
FIG. 2 is a partially sectioned side view of the quick connect/disconnect coupling of the present invention shown in the connected position.

Referring now to FIG. 2, there is shown a sectional side view of the male and female couplings in their connected position. As indicated previously, when the male coupling is inserted and locked into the female coupling, the reinforced annular rims 13 and 25 of the male and female couplings respectively, lie adjacent one another. Locking lever 24 is pivotably mounted to the female coupling 20 for providing a camming cooperating about pivot pin 32. Each locking lever is disposed between a pair of ears 33 and 33a shown in FIG. 1 which are preferably integral to the female coupling. An annular ridge 34 below reinforced rim 25 is provided to reinforce the distal end of female coupling and for the mounting of the locking levers. The upper end 35 of ridge 34 flares outwardly and extends between ears 33 and 33a as shown in the section of FIG. 2 to enable the locking lever 24 to fully open, as shown by phantom line 36. A stopper 37 is provided between the ears 33, 33a below the cam openings 31 to abut against a lip portion 38 of lever 24 to prevent the locking lever from being collapsed into the connecting portion of flexible hose 38. The curved handle of lever 24 enables an operator to reach under the lever to unlock the coupling.

As seen from FIG. 2 a gasket 40 is normally provided in the shoulder 42 of the female coupling, at the base of the inner wall 26. The gasket sits in an annular recess 44. We have discovered that in order to retain the gasket 40 in the recess the wall 46 of the recess is sloped inwardly slightly.

As shown in FIG. 2, the stems 11 and 21 are threadably engaged to the respective couplings. In the case of stem 11 it includes threads 45 which engage threads in the male coupling. Likewise stem 21 has threads 47 that engage the female coupling. This arrangement shows greater versatility and permits the couplings per se to be connected directly to an externally threaded rigid pipe for instance.

Figure 3:
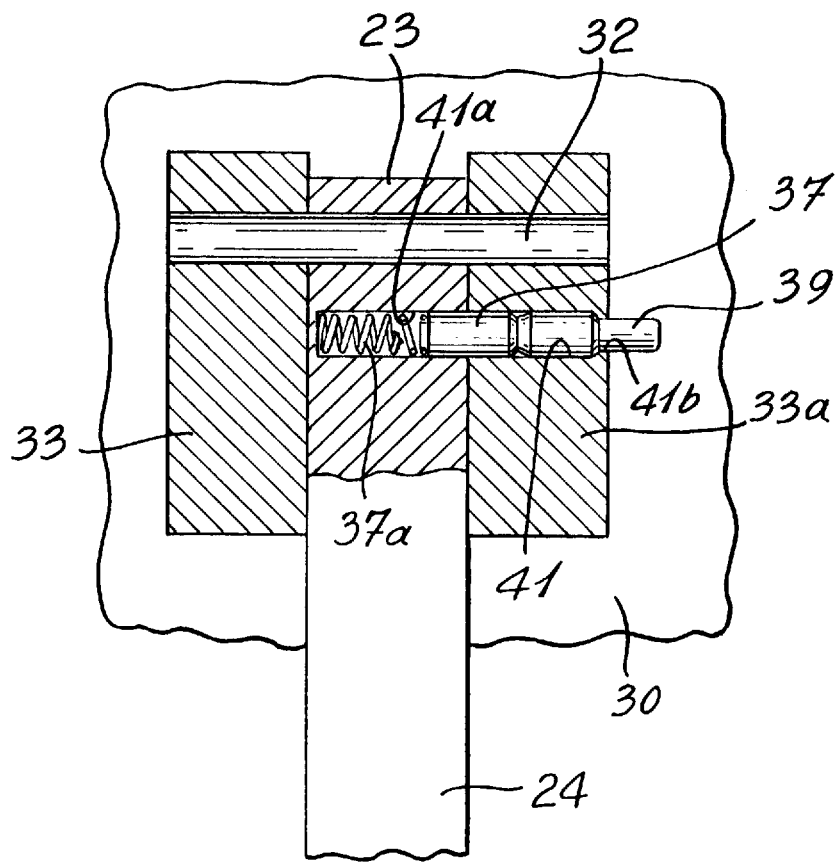
FIG. 3 is an enlarged fragmentary view, partly in cross-section of a detail of the present invention.

Locking device 39 is illustrated in FIG. 3. A bore 41 extends through one of the ears such as 33a to match with a corresponding bore 41a in the lever 24. The bore 41 is provided with a reduced diameter shoulder 41b. The locking device includes a sliding pin 37 urged outwardly by means of spring 37a. A plunger 39 including a portion which extends outwardly from the neck 41b which slides in the bore 41 is adapted to push the pin 37 against the spring 37a to a position where the pin 37 is completely within the bore 41a of lever 24. At that point, the lever 24 is free to pivot upwardly. Once the lever 24 is pivoted upwardly the bore 41a is no longer in registry with the bore 41, and thus the spring 37a would urge the pin 37 against the flat inner surface of ear 33a. When the lever 24 is closed such as in FIG. 2, the pin 37 will find bore 41 on the urging of spring 37a, and thereby lock the lever 24 in its closed position.

Figure 4:
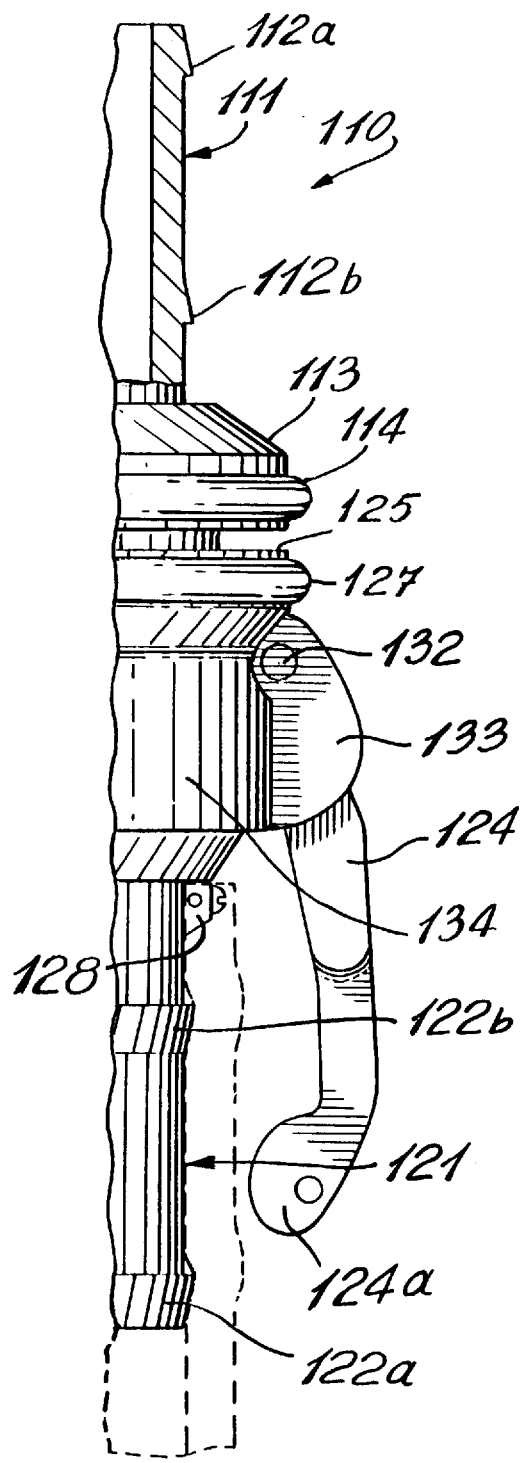
FIG. 4 is a fragmentary partially section side view of another embodiment of the quick disk connect/disconnect coupling of the present invention shown in a connected position.

In the embodiment shown in FIG. 4 all of the elements which are similar to the embodiments which are similar to the embodiments in FIGS. 1 and 2 have been raised by 100. Notably in this embodiment the bumpers 114 and 127 are cast aluminum integral with the cast bodies of the couplings. On opposed sides the bumpers 114 and 127 there are provided annular sloped walls 113 which are formed by the frusto-conical configuration of the wall. The sloped walls avoid the coupling from being hooked by the bumpers 114 and 127 against various objects when the coupling may be dragged along the ground.

Furthermore, the lever 124 includes two cam ends which are interchangeable for different size couplings. For instance in a smaller coupling the end of lever 124 includes a cam 122a and thus the lever would be reversed. A ground terminal 128 is also provided.

Many other modifications may be contemplated. For instance for food industry the male and female couplings may be made of molded plastics. The interior of the couplings may also be coated or otherwise lined with a suitable metal alloy.

It has also been noted that by designing sloped retaining ribs 112 and 122a of a smaller diameter than retaining ribs 112b and 122b, that the insertion of the hose or flexible pipe on the stems 111 and 121 is made easier.

We claim:

1. A quick connect/disconnect coupling comprised of a male and female coupling member, said male coupling member defining a first circular tube having a predetermined first outer radius adapted to mate with said female coupling member, the male coupling member having a tubular stem extending away from the first circular tube for connection with a conduit tube, said female coupling member having a second circular tube with a second outer radius and defining a seat with an inner radius greater than said first outer radius of said first circular tube to receive said first circular tube, the female coupling member having a tubular stem extending away from the second circular tube thereof for connection with a conduit tube; and locking means for retaining said first circular tube within the seat of said second circular tube, said locking means being comprised of a pair of locking levers pivotably mounted to the second circular tube, each lever having a cooperating projection adapted to extend through an opening in said second circular tube into said seat to engage a complementary annular cavity defined in the outer surface of the first circular tube to maintain said male coupling member in a mating relationship with said female coupling member when said locking lever is in a closed position, characterized by:

said female coupling member being provided with a second annular bumper extending radially of said coupling member at the distal end of the second circular tube thereof having a predetermined second bumper radius greater than the second outer radius of said second circular tube, the male coupling member being provided with a first annular bumper extending radially of said coupling at a mid-portion of the first circular tube thereof having a first bumper radius substantially the same as the second bumper radius, such that when said male coupling member is inserted and locked into said female coupling member, the first and second annular bumpers of said male and female couplings are adjacent one another in order to reinforce the resistance to shock of the coupling.

2. A quick connect/disconnect coupling as defined in claim 1, wherein said female coupling member is provided with a tapered inner wall defining the seat and the inner wall flares outwardly to the distal end of the second circular tube and said male coupling member is provided with a tapered outer wall which flares inwardly towards its distal end.

3. A quick connect/disconnect coupling as defined in claim 1, wherein said first and second annular bumpers are each provided with an annular concave cavity and a resilient bumper band is seated in the concave cavity adapted to absorb the impact of a shock when the couplings are subjected to shock.

4. A quick connect/disconnect coupling as defined in claim 3, wherein said seat in said female coupling member is provided with an annular shoulder and a gasket on the shoulder is arranged to abut the distal end of said male coupling member, when the male member is inserted and locked therein.

5. A quick connect/disconnect coupling as defined in claim 4, wherein said annular shoulder includes an annular recess and the recess is provided with an inner retaining wall which slopes inwardly from the shoulder to provide the recess with a wider base than at the shoulder in order to retain said gasket in said annular recess.

6. A quick connect/disconnect coupling as defined in claim 1, wherein said stems are adapted for receiving a flexible hose, said stems being threadably mounted to said male and female coupling members.

7. A quick connect/disconnect coupling as defined in claim 1, wherein each of said pair of locking levers is pivotably mounted to said female coupling member between a pair of ears integral to said second circular tube, said second circular tube having an annular ridge below said locking lever acting as a stop when said locking lever is returned to a closed position, thus maintaining said locking lever spaced apart from said coupling member to enable an operator to easily open the levers.

8. A quick connect/disconnect coupling as defined in claim 7, wherein said locking lever and each of said ears being provided with a hole adapted to align and receive a lock pin when said locking lever is placed in a closed position.

9. The quick connect/disconnect coupling as defined in claim 1, wherein the first and second bumpers each include a frusto-conical component providing a sloped annular wall between the radial extent of each bumper and the respective circular tube.

10. The quick connect/disconnect coupling as defined in claim 1, wherein a ground terminal is provided on each of the first and second circular tubes adjacent the respective first and second bumpers.

11. The quick connect/disconnect coupling as defined in claim 1, wherein each locking lever is an elongated arm having a cam with a pivoting bore at each end thereof, such that the locking lever has interchangeable ends.

* * * * *